Patented June 5, 1945

2,377,832

UNITED STATES PATENT OFFICE 2,377,832

PRECIPITATION OF COBALTIC HYDROXIDE

Albert Edward Wallis and De Witt Henry West, Clydach, Swansea, England, assignors to The International Nickel Company, Inc., New York, N. Y., a corporation of Delaware No Drawing. Application January 19, 1943, Serial No. 472,875. In Great Britain November 28, 1941

6 Claims. (Cl. 23—183)

The present invention relates to the production of cobaltic hydroxide from liquors or mixed salts in which the cobalt is present as the chloride or the sulphate.

Various methods have been employed in the prior art for precipitating cobaltic hydroxide from liquors containing salts of both cobalt and of nickel. One method involves the use of hypochlorites of the alkali metals or alkaline earth metals while the other method involves the use of nickelic hydroxide. This latter method provides advantages in comparison with the other prior art methods in that the resultant solution of nickel salts is pure enough to be used directly for the production of industrial nickel sulphate. However, the crude cobaltic hydroxide cake produced in this latter method invariably contains insoluble nickel compounds in amounts such that the cake must be redissolved in acids and then the cobaltic hydroxide must be reprecipitated by other re-agents, for example, by alkalies and hypochlorites. The cake of cobaltic hydroxide produced by precipitation with nickelic hydroxide invariably contains from 10 to 50% or more of insoluble nickel compounds.

As those skilled in the art know, the "hypochlorite" method provides a cobaltic hydroxide of greater purity than can be obtained by precipitation of the cobalt with nickel compounds. However, the filtrate in the "hypochlorite" method is not suitable for preparation of nickel salts. On the other hand, while the cobaltic hydroxide produced by precipitation with nickel compounds is not of as high purity as that produced in the "hypochlorite" method, the filtrate is suitable for direct production of nickel salt. One of the important advantages of the present invention is that cobaltic hydroxide of as high purity as that produced by the "hypochlorite" method can be produced and in addition the filtrate is suitable for the direct production of nickel salt.

It is an object of the present invention to provide a process for recovering cobalt from liquors or salts containing nickel as well as cobalt in water soluble form.

It is another object of the present invention to recover cobalt from mixtures containing cobalt and nickel as cobaltic hydroxide containing appreciably less than 10% of nickel.

It is a further object of the present invention to provide a means for recovering cobalt as cobaltic hydroxide from mixtures containing cobalt and nickel wherein the pH of the reaction is maintained within critical limits to provide a first precipitate of cobaltic hydroxide containing less than about 10% of nickel.

The present invention also has as an object the production of cobaltic hydroxide of high purity and the production of a solution suitable for the direct production of nickel salt.

Other objects and advantages will become apparent from the following description.

Broadly stated, the present invention provides a means for precipitating cobaltic hydroxide of much greater purity with respect to nickel than can be obtained in the prior art process employing nickel compounds as precipitants. The invention involves maintaining the pH of the reaction medium within certain critical limits. In prior art practice the process of precipitating cobaltic hydroxide by the addition of nickelic hydroxide to the aqueous solution of a cobalt salt the pH value of the medium was generally within the range of about pH 3.0 to about pH 4.0. A liquor containing nickel and cobalt in the ratio of 8:1 when treated in accordance with prior art practice to precipitate cobaltic hydroxide by the addition of nickelic hydroxide would generally yield a cobaltic hydroxide precipitate containing from 15 to 20% nickel calculated on the metallic cobalt content of the hydroxide precipitate. On the other hand, a liquor in which the nickel cobalt ratio is the same as set forth hereinbefore when treated in accordance with the principles of the present invention will yield a cobaltic hydroxide precipitate having a nickel content based upon the metallic content of the precipitate of only about 4%. Such a cobaltic hydroxide precipitate containing only about 4% nickel may be used industrially without further purification. On the other hand, a cobaltic hydroxide precipitate containing 15 to 20% nickel as produced by prior art practice must be further purified before it is acceptable for industrial use.

In the practice of the present invention liquors containing 40 to 140 grams per liter of nickel and from 6 to 30 grams per liter of cobalt can be successfully treated to produce cobaltic hydroxide precipitates containing as little as 4% nickel and a maximum of 20% nickel in contrast to a minimum of 10% and a maximum of 50% or more of nickel in cobaltic hydroxide precipitated by nickelic hydroxide at pH 3.0–pH 4.0. The cobalt is precipitated from the aqueous solution by the addition of a hydrated nickel oxide having the formula $Ni_2O_3.3H_2O$ which in solution acts as a hydroxide having the formula $Ni_2(OH)_6$. In order to obtain the novel results provided by the present invention, the precipitation of the cobaltic hydroxide takes place in a medium in which the pH is controlled and maintained between the limits of about pH 1 to about pH 2.4 and preferably pH 1.8. That is to say, it is preferred to maintain the pH of the solution at or close to pH 1.8. The adjustment of the pH of the medium may take place before, during or after the addition of the nickel hydroxide precipitant but it is preferred to adjust the pH value after the addition of the nickel hydroxide precipitant.

If the original liquor or solution of mixed salts contains iron, this may be removed if it is desired by any convenient method before the cobaltic hydroxide is precipitated. If the iron is not removed, it will remain associated with the cobalt and will be precipitated together with the cobalt as ferric hydroxide.

The reaction may be carried out at any convenient temperature but preferably the temperature of the reaction is held between about 40 and about 60 degrees C.

As set forth hereinbefore, the present invention provides improved results even when the liquors treated contain as much as 140 grams of nickel per liter and the highest nickel ratios to cobalt that are customarily met in industry. Even when the ratio of nickel to cobalt is the highest within the limits set forth hereinbefore the cobalt precipitate will contain only about 40% as much nickel as cobalt precipitated under the conditions previously considered satisfactory. Thus, for example, under conditions of nickel to cobalt ratio which under prior art practice would have produced cobalt hydroxide precipitates containing about 50% or more nickel based upon the metallic cobalt content of the precipitate, cobalt hydroxide precipitates can be produced in accordance with the present process containing not more than about 20% nickel.

Although the present invention has been described in conjunction with certain preferred embodiments thereof, those skilled in the art will understand that modifications and variations may be made therein. Such variations and modifications are to be considered within the purview of the specification and the scope of the appended claims.

Reference is hereby made to our copending application Serial Number 472,874, filed on even date herewith, disclosing purifying precipitates of cobaltic hydroxide containing nickel.

We claim:

1. A process for precipitating cobalt as a hydroxide which comprises adding hydrated nickel oxide to an aqueous solution containing soluble cobalt salts to precipitate a hydroxide of cobalt and maintaining said aqueous solution at a pH of about 1.0 to about 2.4.

2. A process for precipitating cobalt as a hydroxide which comprises adding hydrated nickel oxide to an aqueous solution containing soluble cobalt salts to precipitate cobalt as a hydroxide whilst maintaining said aqueous solution at a pH between about pH 1.0 and about pH 2.4 and a temperature of about 40° C. to about 60° C.

3. A process for precipitating cobalt as a hydroxide which comprises adding hydrated nickel oxide to an aqueous solution containing soluble cobalt salts to precipitate cobalt hydroxide whilst maintaining said aqueous solution at a pH of about 1.8.

4. A process for precipitating cobalt as a hydroxide which comprises adding hydrated nickel oxide to an aqueous solution containing soluble cobalt salts to precipitate cobalt hydroxide whilst regulating the temperature of said aqueous solution between about 40° C. and about 60° C. and whilst maintaining a pH of about 1.8 in said aqueous solution.

5. A process for precipitating cobaltic hydroxide which comprises establishing an aqueous solution containing 40 to 140 grams per liter of nickel and about 6 to about 30 grams per liter of cobalt and precipitating cobalt hydroxide by the addition of nickelic hydroxide whilst maintaining a pH of about 1.0 to about 2.4.

6. The process as set forth in claim 5 wherein the pH is adjusted after the addition of the nickelic hydroxide.

A. E. WALLIS.
DE W. H. WEST.